United States Patent
Goldstein et al.

[11] Patent Number: 5,912,398
[45] Date of Patent: Jun. 15, 1999

[54] BIOMEDIATED CONTINUOUS RELEASE PHOSPHATE FERTILIZER

[75] Inventors: Alan H. Goldstein, Beverly Hills, Calif.; Robert D. Rogers, Idaho Falls, Id.

[73] Assignee: Lockheed Idaho Technologies Company, Idaho Falls, Id.

[21] Appl. No.: 08/490,964

[22] Filed: Jun. 15, 1995

[51] Int. Cl.⁶ .......................... C05F 11/08; A01N 25/00; B09B 3/00
[52] U.S. Cl. .............. 71/6; 71/64.07; 71/64.11; 71/64.13; 435/262.5
[58] Field of Search .......... 71/6, 64.07, 64.11, 71/64.13; 435/262.5

[56] References Cited

U.S. PATENT DOCUMENTS 5,256,544  10/1993  Rogers et al. ........................ 435/42

OTHER PUBLICATIONS

Sperber, J., "Solution of Mineral Phosphates by Soil Bacteria," *Nature* vol. 180, pp. 994–995 (1957) no month.
Halder, A. K., "Solubilization of Roc kPhosphate by *Rhizobium* and *Bradyrhizobium*," Journal of General Appl. Microbiology, vol. 36, pp. 81–92 (1990) no month.
Louw, H. A., "A Study of Soil Bacteria Dissolving Certain Mineral Phosphate Fertilizers and Related Compounds," Journal of Appl. Bact., vol. 22, pp. 227–233, 1959 no month.
Ancheng, "Effect of organic manure on the biological activities associated with insoluble phosphorus release in a blue purple paddy soil", Abstract, 121:107357, 1994, Commun. Soil Sci. Plant Anal. 25(13–14) no month.
Rogers et al, "Research and engineering assessment of biological solubilization of phosphate", 1993, Abstract 122:110025, Energy Res. Abstr, 1993, 18(9) Abstr #26522 no month.
Minhoni et al Effect of five types of organic matter on the microbial solubilization of rock phosphate, Abstract 115:255072, Rev. Bras. Cienc. Solo 1991, 15(1), 29–35 no month.

*Primary Examiner*—Ferris Lander
*Attorney, Agent, or Firm*—Alan D Kirsch; Thorpe North & Western

[57] ABSTRACT

A composition is disclosed for providing phosphate fertilizer to the root zone of plants. The composition comprises a microorganism capable of producing and secreting a solubilization agent, a carbon source for providing raw material for the microorganism to convert into the solubilization agent, and rock phosphate ore for providing a source of insoluble phosphate that is solubilized by the solubilization agent and released as soluble phosphate. The composition is provided in a physical form, such as a granule, that retains the microorganism, carbon source, and rock phosphate ore, but permits water and soluble phosphate to diffuse into the soil. A method of using the composition for providing phosphate fertilizer to plants is also disclosed.

27 Claims, 8 Drawing Sheets

BIOMEDIATED CONTINUOUS RELEASE PHOSPHATE FERTILIZER

CONTRACTUAL ORIGIN OF THE INVENTION

The United States Government has rights in this invention disclosed under contract number DE-AC07-76ID01570 between the U.S. Department of Energy and EG&G Idaho, Inc., now contract number DE-AC07-94ID13223 with Lockheed Idaho Technologies Company.

BACKGROUND OF THE INVENTION

This invention relates generally to phosphorus fertilization of plants. More particularly, the invention relates to a composition and a process for providing continuous release phosphate fertilizer involving mineral phosphate solubilizing ($Mps^+$) bacteria or other microorganisms and rock phosphate ore, wherein the ore is solubilized and released into the soil by a solubilizing agent produced by the bacteria or other microorganisms.

Phosphorus is essential for virtually all major metabolic processes in plant growth and development. It is considered a macronutrient because it makes a relatively high percentage contribution to plant biomass. However, phosphorus is one of the least soluble mineral nutrient ions in soil. In fact, the level of phosphorus in the solution phase of naturally occurring soils is often below that of many micronutrients. E. Epstein, Mineral Nutrition of Plants 44 (1972); M. Fried & H. Broeshart, The Soil-Plant System in Relation to Inorganic Mineral Nutrition 545 (1967). The low availability of phosphorus makes it the limiting element for plant growth in natural ecosystems. P. Ozanne, Phosphate Nutrition of Plants—A General Treatise, in The Role of Phosphorus in Agriculture 559–85 (F. E. Khasawneh et al. eds., 1980). Not surprisingly, most higher plants have highly efficient mechanisms for absorbing phosphorus from soil. However, maximum agronomic productivity is achieved only with addition of phosphorus fertilizer.

Most phosphorus fertilizers in use today are made by processes involving mining and chemical processing of insoluble mineral phosphate ore, primarily fluorapatite. R. Young & C. Davis, Phosphate Fertilizers and Process Technology, in The Role of Phosphorus in Agriculture 195–225 (F. Khasawneh et al. eds., 1980); M. Fried & H. Broeshart, The Soil-Plant System in Relation to Inorganic Mineral Nutrition 545 (1967); W. Horwitz ed., Methods of Analysis of the Association of Official Agricultural and Food Chemists—Phosphorus 9–14 (AOAC, 13th ed. 1980). Chemical conversion of mineral phosphate ore into soluble orthophosphate is an energy intensive process involving treatment of the ore with sulfuric acid at high temperatures. This results in almost complete solubilization of the ore, but undesirable contaminants are released into gas streams, by-product streams, and soluble phosphate products. Thus, pollution abatement is a substantial cost to the phosphate fertilizer industry. Further, relatively high grade ore is required, lower grade ore being avoided in the mining process or rejected as tailings, thus driving up costs even more. Methods of selective, low temperature conversion of mineral phosphate ore to soluble phosphate would alleviate pollution, increase the effective ore reserves, and decrease production costs.

U.S. Pat. No. 5,256,544 to Rogers et al. describes an industrial scale continuous bioprocess for solubilizing rock phosphate ore by microbial action. The method involves forming an aqueous mixture of phosphate solubilizing microorganisms and phosphate ore particles of an appropriate size and maintaining the mixture under conditions whereby the phosphate ore particles are solubilized by a solubilizing agent produced and released by the microorganisms. The mixture is then fractionated into an aqueous fraction containing the soluble phosphate and a slurry fraction containing undissolved solids. The soluble phosphate is removed from the aqueous fraction, and the microorganisms present in the aqueous fraction are then recycled together with the undissolved solids of the slurry fraction to continue the solubilization and separation process.

Fertilizers produced from rock phosphate ore are largely soluble in aqueous solution and include ammonium, potassium, and sodium orthophosphates, several forms based on monocalcium phosphate (super, triple super, and concentrated superphosphate), ammonium and urea-ammonium (poly) phosphates, and various phosphate solutions. These fertilizers are applied to the soil by various cultural methods to maintain the amount of soluble phosphate above a level that gives >90% of maximum yield. P. Ozanne, Phosphate Nutrition of Plants—A General Treatise, in The Role of Phosphorus in Agriculture 559–85 (F. E. Khasawneh et al. eds., 1980).

Agronomic rates of application of phosphorus fertilizer are usually well above what would be needed under ideal conditions. While competition with soil microorganisms diminishes fertilizer efficiency somewhat, a major role in the inefficient use of phosphorus fertilizer in agriculture is retention or fixation of phosphate in insoluble mineral complexes. In some soils, up to 75% of applied phosphorus may be reprecipitated into insoluble mineral forms, requiring application of up to 4 times the phosphorus needed by the crop to compensate for this unavailability.

Phosphorus is almost immobile in the soil, thus agronomically useful phosphorus fertilization must occur at the root/soil interface, known as the rhizosphere. The prevailing agronomic philosophy has been to maintain the levels of ionic phosphate in the bulk soil solution above the critical level that will provide adequate nutrition to plants. An alternative to this approach involves the regulation of phosphate availability within the rhizosphere. A microbial agent acting to solubilize mineral phosphates would be an important component of this system.

The presence of mineral phosphate solubilizing microorganisms in the rhizosphere has often been suggested. F. Gerretsen, 1 Plant and Soil 51–81 (1948); W. Sackett et al., 20 Central bl. Bakteriol. 688–703 (1908). Recently, the symbiotic plant/fungus associations known as mycorrhizae have received attention for improving phosphorus mineral nutrition. P. Tinker, The Role of the Rhizosphere in Phosphorus Uptake by Plants, in The Role of Phosphorus in Agriculture 617–47 (F. Khasawneh et al. eds., 1980). The possibility that rhizosphere bacteria may act to make phosphate available has also been explored. In F. Gerretsen, 1 Plant and Soil 51 (1948), it was suggested that rhizosphere microorganisms play a major role in providing plants with soluble phosphate. In J. Sperber, 180 Nature 994 (1957), lactic, glycolic, fumaric, and succinic acids were identified from cultures of putative mineral phosphate solubilizing bacteria and in soil samples. Digestion zones of from 1 to 10 mm in width around colonies were shown in 84 of 291 bacterial isolates on insoluble phosphate agar. In all cases, solubilization was accompanied by decreases in pH to as low as pH 4.5. These types of bacteria were later shown to be more prevalent in the rhizosphere than in nearby soil. J. Sperber, 9 Aust. J. Agric. Res. 778 (1958). H. Louw and D. Webley, 22 J. Appl. Bact. 216 (1959), obtained over 100 bacterial isolates capable of dissolving insoluble phosphate on agar plates and identified lactic and 2-ketogluconic acids as potential solubilizing substances, but could not correlate the occurrence of these bacteria with the rhizosphere. R. Duff & D. Webley, Chem and Ind. 1376 (Oct. 31, 1959), proposed that 2-ketogluconic acid produced by bacteria plays an important role in solubilizing phosphate in soil.

"Biosuper," a mixture of mineral phosphate, granulated sulfur, and sulfur oxidizing bacteria such as Thiobacillus spp., has been reported to provide effective phosphorus fertilization under some conditions. K. Raghu & I. Macrae, 29 J. Appl. Bact. 582 (1966); S. Rajan & R. Fox, 39 Soil Sci. Am. Proc. 846 (1973); S. Rajan, 2 Fertilizer Res. 199 (1981). The sulfur oxidizing bacteria produce sulfuric acid that reacts with the mineral phosphate to form monocalcium phosphate (superphosphate), phosphoric acid, and calcium sulfate. While of potential utility, the sulfuric acid pathway is apparently not utilized by most naturally occurring mineral phosphate solubilizing bacteria in the rhizosphere.

The general conclusions of other recent research, A. Moghimi et al., Soil Biol. Biochem. 277 (1978); A. Moghimi et al., 10 Soil Biol. Biochem. 283 (1978); A. Moghimi et al., 10 Soil Biol. Biochem. 289 (1980); N. Subba Rao 7 Interdisciplinary Sci. Rev. 220 (1982); N. Subba Rao, Phosphate Solubilization by Soil Microorganisms, in Advances in Agricultural Microbiology 295 (N. Subba Rao ed., 1982), comport with those of previous studies: (1) a significant percentage of bacteria isolated from soil has the ability to solubilize dicalcium phosphate and/or other poorly soluble mineral phosphates; (2) production of low molecular weight organic acids, which often accompany phosphate solubilization, may account for the phenomenon either through acidification, calcium chelation, or both; and (3) the population of mineral phosphate solubilizing bacteria is substantially higher in the rhizosphere than in non-rhizosphere areas.

Because of the low level of soluble orthophosphate in most ecosystems, bacteria have evolved genetic systems that control the ability to extract orthophosphate from poorly soluble organic and mineral phosphates. The most extensively studied example of the bacterial phenomenon of enhanced capability to solubilize exogenous organic phosphorus and thus increase the external orthophosphate concentration concerns the Phosphate Starvation Inducible (PSI) multicomponent gene system or regulon of *E. coli*. B. Wanner & R. McSharry, 158 J. Mol. Biol. 347 (1982). Under conditions of phosphorus starvation, this regulon, which includes the gene for bacterial alkaline phosphatase, is induced to hydrolyze organic phosphates to orthophosphate and facilitate its uptake.

The genetic regulation of bacterial mineral phosphate solubilization capability has also been addressed. A. Goldstein, 1 Am. J. Alt. Agric. 51 (1986); A. Goldstein & S. -T. Liu, 5 Bio/Technology 72 (1987). *Erwinia herbicola* EH010 (ATCC 39368) was shown to have an inducible/ repressible mineral phosphate solubilizing trait. Inoculation of agar plates containing insoluble dicalcium phosphate and selected concentrations of soluble phosphate showed that with incremental increases in soluble phosphate there was a corresponding decrease in clearing (solubilization) zone without affecting colony size. Significant repression of gene expression was observed at exogenous soluble phosphate concentrations above 1 mM, and total repression of the trait was evident at concentrations above 20 mM. Further, transformation of *E. coli*, which is incapable of solubilizing hydroxyapatite, with a cosmid library of *E. herbicola* genomic DNA resulted in isolation of a recombinant clone that exhibited inducible/repressible hydroxyapatite solubilization at a level comparable with *E. herbicola*.

Copending U.S. patent application Ser. No. 08/114,410, filed Aug. 30, 1993, and entitled "Genetic and Biochemical Pathway for Bacterial Solubilization of Rock Phosphate," discloses a process for converting rock phosphate ore into soluble phosphate by culturing bacterial cells capable of producing and accumulating gluconic acid in an aqueous medium containing insoluble rock phosphate ore. The gluconic acid acidifies the medium, thus solubilizing the rock phosphate. Gluconic acid is produced by oxidation of glucose catalyzed by a quinoprotein glucose dehydrogenase. S. -T. Liu et al., 174 J. Bacteriol. 5814 (1992).

OBJECTS AND SUMMARY OF THE INVENTION

It is an object of the present invention to provide a composition and a method for supplying phosphate fertilizer to the rhizosphere of plants by in situ solubilization of rock phosphate ore.

It is also an object of the invention to provide a composition and a method for continuous release of phosphate fertilizer in the rhizosphere.

It is another object of the invention to provide a composition and a method for microorganism-mediated solubilization of rock phosphate ore in the rhizosphere of plants.

It is still another object of the invention to provide a composition and a method for achieving high efficiency utilization of phosphate fertilizer so that less phosphate fertilizer need be applied to plants than at present.

It is yet another object of the invention to provide a composition and a method of delivering phosphate fertilizer to the root zone of plants such that the number of applications of phosphate fertilizer in a growing season is reduced.

It is another object of the invention to provide a composition and a method for delivering phosphate fertilizer to the root zone of plants such that fixation of soluble phosphates into insoluble forms is retarded.

It is still another object of the invention to provide a composition and method for applying phosphate fertilizer to the root zone of plants such that pollution is alleviated, effective ore reserves are increased, and production costs are decreased.

These and other objects may be achieved by providing a composition that furnishes continuous release of soluble phosphate into soil for uptake by plants, comprising a microorganism capable of producing and releasing a solubilization agent for solubilizing insoluble phosphate; a carbon source for providing raw material to the microorganism for conversion into the solubilization agent; and a source of insoluble phosphate for being solubilized by the solubilization agent, thereby releasing soluble phosphate; wherein the composition is formulated in a physical form such that the microorganism, carbon source, and source of insoluble phosophate are retained adjacent to each other within the physical form and the soluble phosphate is diffusible out of the physical form into the soil. The preferred source of insoluble phosphate is rock phosphate ore. The solubilization agent comprises gluconic acid, 2-ketogluconic acid, lactic acid, glycolic acid, fumaric acid, succinic acid, or mixtures thereof, with 2-ketogluconic acid being the preferred solubilization agent. The carbon source comprises glucose, or polymers or copolymers of glucose, with starch being a preferred carbon source. The physical form of the composition can be a granule including an exterior semipermeable wall composed of a polymeric membrane, or a porous matrix.

A method for providing continuous release of soluble phosphate into soil for uptake by plants comprises the steps of furnishing the continuous release composition described above and placing the composition in the soil.

DETAILED DESCRIPTION OF THE INVENTION

Figure 1:
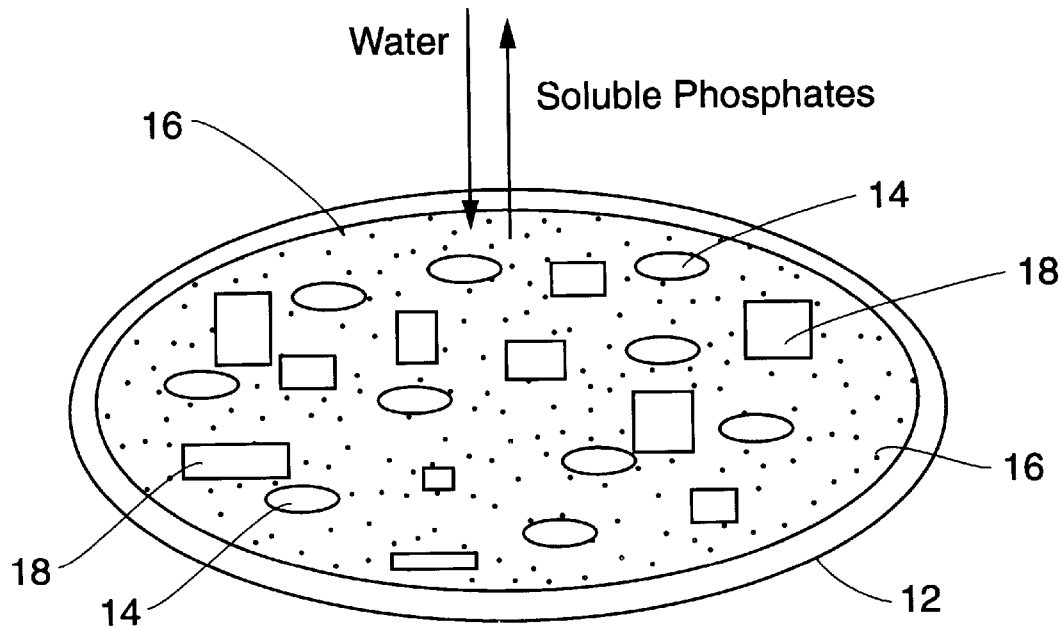
FIG. 1 is a schematic representation of a biomediated continuous release phosphate fertilizer granule according to the present invention.

Before the present composition and method for biomediated continuous release phosphate fertilizer are disclosed and described, it is to be understood that this invention is not limited to the particular examples, process steps, and materials disclosed herein as such examples, process steps, and materials may vary somewhat. It is also to be understood that the terminology used herein is used for the purpose of describing particular embodiments only and is not intended to be limiting since the scope of the present invention will be limited only by the appended claims and their equivalents.

It must be noted that, as used in this specification and the appended claims, the singular forms "a," "an," and "the" include plural referents unless the context clearly dictates otherwise. Thus, for example, reference to a biomediated continuous release phosphate fertilizer containing "a microorganism" includes a mixture of two or more microorganisms, reference to "a rock phosphate ore" includes reference to two or more of such rock phosphate ores, and reference to "a carbon source" includes reference to a mixture of two or more carbon sources.

In describing and claiming the present invention, the following terminology will be used in accordance with the definitions set out below.

As used herein, "microorganism" means a minute living organism that is usually microscopic. Microorganisms of particular interest in the present invention are bacteria, fungi, and actinomycetes.

As used herein, "solubilization agent" means a substance produced through metabolic processes of the microorganism present in the composition that converts water-insoluble phosphate, such as rock phosphate ore, into a soluble phosphate form. Preferred solubilization agents are low molecular weight organic acids of relatively low pKa such as gluconic acid, 2-ketogluconic acid, lactic acid, glycolic acid, fumaric acid, and succinic acid and mixtures thereof. 2-Ketogluconic acid produced by direct oxidation of glucose mediated by a quinoprotein glucose dehydrogenase is especially preferred.

As used herein, "carbon source" means an organic compound that can be metabolized by a microorganism for use as a raw material for synthesis of the solubilization agent. A carbon source may also be used by the microorganism as a source of energy and hydrocarbons in other metabolic processes. Glucose and polymers and copolymers thereof, such as starch, are preferred carbon sources.

As used herein, "granule," "pellet," and similar terms mean compositions according to the present invention comprising a microorganism, carbon source, and source of insoluble phosphate, such as rock phosphate ore, in a physical form wherein water can diffuse into the granule or pellet, and soluble phosphate and optionally the solubilization agent can diffuse out of the pellet or granule while retaining the microorganism, carbon source, and rock phosphate ore in close proximity to each other. Such granules or pellets can be formulated with a semipermeable membrane wall, such as a molecular weight cut-off membrane, forming the exterior boundary of the granule or pellet, or can be formulated without such membrane wall wherein the microorganism, carbon source, and rock phosphate ore are held together by another mechanism, such as in a porous matrix that permits inflow and outflow of liquids, dissolved compounds, and the like.

The composition of the present invention comprises a microorganism capable of producing and releasing a solubilization agent for solubilizing rock phosphate ore or other insoluble phosphate into soluble phosphate, a carbon source for providing raw material for conversion into the solubilization agent, and a source of insoluble phosphate for being solubilized by the solubilization agent, thereby releasing soluble phosphate. The preferred source of insoluble phosphate is rock phosphate ore. The composition is formulated in a physical form such that the microorganism, carbon source, and source of insoluble phosphate are retained adjacent to each other within the physical form and the soluble phosphate is diffusible out of the physical form into the root zone of plants. FIG. 1 shows an embodiment of the invention in the form of a granule 10 bounded by a microporous membrane 12 that permits water and other small molecules, such as soluble phosphates, to pass into and out of the granule 10 while retaining microorganisms 14, rock phosphate ore 16, and larger molecules, such as the carbon source 18.

Microorganisms that can be used in practicing the present invention are those that produce and release a solubilization agent in the course of metabolism. Of particular interest are bacteria exhibiting the mineral phosphate solubilizing (Mps$^+$) trait as well as fungi and actinomycetes that exhibit the ability to solubilize rock phosphate ore and other sources of insoluble phosphate. Preferred microorganisms are selected from the genera Erwinia, Pseudomonas, Gluconobacter, Klebsiella, Acinetobacter, Aspergillus, Penicillium, Paecilomyces, Acremonium, Verticillium, Geomyces, Chrysosporium, and mixtures thereof. More preferred microorganisms include *Pseudomonas cepacia, Aspergillus niger, Aspergillus phenicis, Penicillium herquei, Penicillium funiculosum, Penicillium lanoso-coerulum, Penicillium simlicissum, Penicillium atramentosum, Penicillium roquefortii*, Paecilomyces sp., Acremonium sp., Verticillium sp., Geomyces sp., Chrysosporium sp., and mixed cultures thereof. Also preferred are strains of these named microorganisms that have been selected or mutated to have enhanced rock phosphate solubilizing properties. Although these microorganisms are specifically named because they have been shown to exhibit rock phosphate solubilizing properties, other microorganisms that exhibit the same functionality may also be suitable and are intended to be within the scope of the invention.

Recombinant DNA technology can also be used to produce microorganisms that make and release solubilization agents although the microorganisms did not synthesize solubilization agents prior to genetic modification. This has been demonstrated in S. -T. Liu et al., 174 J. Bacteriol. 5814 (1992), and copending U.S. patent application Ser. No. 08/114,410 filed Aug. 30, 1993, and entitled "Genetic and Biochemical Pathway for Bacterial Solubilization of Rock Phosphate." In these documents, an *E. coli* strain incapable of solubilizing rock phosphate was rendered capable of solubilizing rock phosphate by transformation with a plasmid containing a gene for synthesis of pyrroloquinoline quinone (PQQ) from an Mps$^+$strain of *Erwinia herbicola*. The PQQ synthesis gene was expressed by the *E. coli* strain after transformation, thus complementing a missing function that prevented the *E. coli* strain from directly oxidizing glucose to gluconic acid. The product of the PQQ synthesis gene expressed by the transformed *E. coli* converted endogenous *E. coli* apoglucose dehydrogenase into glucose dehydrogenase (GDH) holoenzyme fully capable of directly converting glucose into gluconic acid. Gluconic acid produced by the genetically modified *E. coli* strain was the solubilization agent for solubilizing the insoluble phosphate into soluble form. Thus, microorganisms mutated by recombinant DNA technology are also intended to be within the scope of the invention.

*Erwinia herbicola* produces gluconic acid from glucose by the quinoprotein GDH pathway, also known as the direct oxidation pathway. The incomplete oxidation of glucose to gluconic acid and then to 2-ketogluconic acid, and subsequent accumulation of high concentrations of these acids in the medium is an essential part of the process of solubilization of insoluble mineral phosphate by Erwinia. Bacterial production of sufficient quantities of exogenous gluconic acid in a metabolic dissimilatory bypass mode is unique to bacteria expressing the quinoprotein glucose dehydrogenase system. B. van Schie, The Physiological Function of Gluconic Acid Production in Acinetobacter Species and other Gram Negative Bacteria (Ph.D. dissertation, Delft Technical University, The Netherlands, 1987). The physical location of quinoprotein GDH on the outer face of the cytoplasmic membrane plays a key role in the ability of these bacteria to accumulate exogenous gluconic acid. Therefore, while there are other glucose oxidase systems, the quinoprotein GDH pathway is the basis for the process of high efficiency solubilization of rock phosphate ore and other poorly soluble mineral phosphates in certain Gram negative bacteria. This is supported by the results of screening a variety of bacterial genera for ability to solubilize insoluble phosphates. All bacteria that showed high efficiency solubilization of hydroxyapatite with glucose as the sole carbon source were members of genera identified as having the quinoprotein GDH pathway, including Acinetobacter, Pseudomonas, Gluconobacter, Erwinia, and Klebsiella. Thus, bacteria from these genera that express the quinoprotein GDH pathway are also preferred microorganisms. Also preferred are strains of these named microorganisms that have been selected or mutated to have enhanced rock phosphate solubilizing properties.

The carbon source of the composition is provided as raw material to be converted into the solubilization agent by the metabolic processes of the microorganism. The carbon source can also be used by the microorganism as a source of energy and hydrocarbons for growth and maintenance of the microorganism. In organisms exhibiting the quinoprotein GDH pathway, glucose is converted directly into gluconic acid, which functions as the solubilization agent. Glucose is a relatively small, water soluble molecule that diffuses readily. Thus, a composition containing glucose as the carbon source, while functional, would have the disadvantage that the glucose could diffuse out of the composition before being oxidized to gluconic acid or 2-ketogluconic acid by the microorganism. Thus, it is preferable to use a carbon source that will not readily diffuse out of the composition. High molecular weight glucose-containing polymers can be retained in the composition by means of a diffusion-limiting mechanism, yet can be depolymerized to yield glucose monomers that can be oxidized into gluconic acid. A preferred glucose-containing polymer is starch because it is readily available, inexpensive, composed entirely of glucose monomers, and is depolymerized into glucose monomers by pathways, such as those involving starch hydrolase, that may be present in microorganisms containing the quinoprotein GDH pathway for oxidizing glucose to gluconic acid. The optimum combination of microorganism and carbon source, with gluconic acid and/or 2-ketogluconic acid as the solubilization agent, will contain a strain of microorganism that has both the direct oxidation pathway activity and the ability to generate glucose from a polymerized material such as starch. According to the CRC Practical Handbook of Microbiology, species of Pseudomonas that have starch hydrolase activity are most or all strains of *P. pseudomallei, P. stutzeri*, and *P. saccharophila*, and some strains of *P. mallei*. Other glucose-containing polymers could also be used and are limited only by their functionality and the ability of the microorganism to depolymerize the polymers into glucose monomers. A person skilled in the art can readily determine which microorganisms contain Mps activity by the ability to solubilize insoluble phosphate in a plate assay, as shown in Goldstein & Liu, 5 Bio/Technology 72 (1987). Starch hydrolase is readily assayed by ability to use starch as a sole carbon source in a plate assay.

Carbohydrates are classified into three groups: monosaccharides (simple sugars including triose, tetrose, pentose, hexose and heptose), oligosaccharides (disaccharides and trisaccharides) and polysaccharides (starch, glycogen, dextrins, gum, mucilage, inulin, cellulose, etc.). The monosaccharides cannot be hydrolyzed into simpler sugars. However, by the appropriate use of acid or enzymes, the higher saccharides can be hydrolyzed into simple sugars. In the body of a warm-blooded animal, the oligosaccharides and polysaccharides are converted to monosaccharides by enzymatic action in the saliva (salivary amylase), from pancreatic secretions (pancreatic amylase), and from enzymes produced in the small intestine i.e. disaccharidases and oligosaccharidases inclusive of maltase, isomaltase, lactase, sucrase and trehalase. Microorganisms generally convert oligosaccharides and polysaccharides to monosaccharides by action of secreted enzymes.

Of the simple sugars, the hexoses are clearly the most important in energy production. These six-carbon-containing sugars are made up of glucose (also called dextrose or corn or grape sugar), fructose (also called levulose or fruit sugar), galactose, and mannose. Most polysaccharides, e.g. starch, glycogen, dextrin and cellulose, yield glucose as the end-product of complete hydrolysis. Some, such as inulin, yield fructose, and some, such as certain gums, yield galactose. Of the various monosaccharides, glucose is clearly the most prevalent as the base source of energy.

Of the oligosaccharides, the disaccharides are more common than trisaccharides. Disaccharides include sucrose (also called cane, beet or table sugar), lactose (called milk sugar), and maltose. On hydrolysis, sucrose in converted into one molecule each of glucose and fructose. Lactose is hydrolyzed to glucose and galactose, and maltose yields two molecules of glucose.

Sucrose is hydrolyzed in vivo in warm-blooded animals by the enzyme sucrase in the intestine into glucose and fructose. Lactose is hydrolyzed to glucose and galactose by the enzyme lactase, also in the small intestine. Microorganisms hydrolyze lactose by the enzyme β-galactosidase. Maltose is obtained in vivo when starch is hydrolyzed by an enzyme (ptyalin) found in saliva and is further hydrolyzed into glucose by the enzyme, maltase, in the small intestine.

The polysaccharides, also referred to as complex carbohydrates, are composed primarily of glucose with some containing fructose and galactose as described above. Starch and glycogen are the most common polysaccharides.

Starch, which occurs abundantly in grains, tubers, and fruits is largely the source of carbohydrates for humans and herbivorous animals. However glycogen (animal starch) which is found in liver and muscles is also a source of complex carbohydrates for carnivores and humans. Glycogen is also found in some of the higher plants such as corn.

From the above, it is evident that both starch and glycogen are polymers of glucose. Starch is made up of two types of molecules, i.e. a linear or non-branched polymer called amylose and a branched polymer called amylopectin. Glycogen is made up on a branched polymer very similar to amylopectin.

Amylose, which is well defined in the literature, is a linear polymer of glucopyranose units joined by an alpha linkage at the first and fourth carbon atoms (referred to as a 1,4-linkage). The molecular weight of amylose varies from about 150,000 to 600,000 daltons, indicating that there are from about 1000 to 4000 glucose units per molecule.

Both amylopectin, from starch, and glycogen have similar structures. These glucose polymers are held together by two types of alpha linkages, a 1,4-glucopyranose linkage and a 1,6-glucopyranose linkage. The 1,4 linkages form straight chains whereas the 1,6 linkages occur on the straight chains at points where one straight chain branches from another. These structures are also well defined in the literature.

Amylopectin and glycogen differ in that glycogen has shorter and more frequent branching. In other words, glycogen contains more 1,6-linkages than does amylopectin. In amylopectin there is about one 1,6-linkage for each 20–25 glucose units. In glycogen there is about one 1,6-linkage for each 10–18 glucose units and branching may occur as often as every six glucose units. The molecular weights of amylopectin and glycogen are much higher than amylose. Amylopectin molecular weights may vary from about one to six million and molecular weights of glycogen can go as high at 100 million daltons.

The ratios or amounts of amylose and amylopectin in starch vary from plant to plant species. In general, most starches yield between about 10–30% amylose and 70–90% amylopectin. In corn, for example, the starch is made up of about 27% amylose and 73% amylopectin. The amylopectin portion of corn starch has about 96% 1,4-linkages and 4% 1,6-linkages.

The major components of starch (those composed of 1,4-linkages) can be enzymatically hydrolyzed in two different ways. Amylose can be hydrolyzed by the α-amylase enzyme. It hydrolyzes α-linkages throughout the amylose chain in such a way as to ultimately yield a mixture of glucose and maltose. Another enzyme, β-amylase, cleaves successive maltose units.

High molecular weight macromolecules such as starch cannot be absorbed into the bacterial cell and used directly in starch metabolism. Such substances are first hydrolyzed outside the cell by extracellular enzymatic activity. In the case of starch, the enzyme αamylase is excreted by many types of bacteria. The activity of this enyzme produces maltose and dextrins that can be absorbed by the cell. These compounds are then further hydrolyzed by intracellular enzymes to glucose.

The invention is not limited to embodiments containing the direct oxidation pathway products, gluconic acid and/or 2-ketogluconic acid, as the solubilization agent(s). Therefore, some embodiments may contain carbon sources other than glucose-containing polymers. However, preferred solubilization agents such as gluconic acid, 2-ketogluconic acid, lactic acid, glycolic acid, fumaric acid, and succinic acid are all products of glucose metabolism. Thus, the preferred solubilization agents can be derived by metabolism of polysaccharides to glucose followed by further metabolism of glucose. Therefore, polysaccharides, such as vegetable or animal starch (glycogen) or natural fruits and vegetables also containing disaccharides and monosaccharides, can be used as carbon sources in the present invention as long as the selected microorganism is able to metabolize the saccharide to glucose, and glucose to the solubilization agent.

Rock phosphate ore can be provided as a component of the composition as a source of insoluble phosphate. The microorganism in the composition metabolizes the carbon source provided, yielding and releasing the solubilization agent. In the case of bacteria having the GDH-mediated direct oxidation pathway, this solubilization agent comprises gluconic acid and/or 2-ketogluconic acid. Certain other bacteria, fungi, actinomycetes, and other microorganisms can produce gluconic acid and/or other solubilization agents. The range of phosphate solubilization abilities within such a heterogeneous group is very large. The simpler calcium phosphate compounds appear to be more susceptible to microbial solubilization than phosphate contained in complex matrices. Previous reports have disclosed that more than 50% of the phosphate in dicalcium and tricalcium phosphates can be released by microorganisms growing in solution, while only 1–33% of the phosphate contained in rock phosphate is released. Louw et al., 22 J. Bacteriol. 227 (1959); Singh et al., 19 Rev. Ecol Biol. Sci. 17 (1982); Kucey, 63 Can. J. Soil Sci. 671 (1983); Singh et al., 53 Curr. Sci. 1212 (1984). However, in U.S. Pat. No. 5,256,544 it was found in batch shake tests that over 90% of tricalcium phosphate can be solubilized by microorganisms growing in solution, and as much as 85% of rock phosphate can be solubilized under similar conditions. It was also demonstrated that this same enhanced degree of solubilization was obtainable with an increased concentration of ore under continuous bioprocess conditions.

Preferably, the rock phosphate ore in the composition is in the size range of about 0.0025 to 0.05 inch in diameter (20–400 mesh or 0.064–1.27 mm). Depending on the size of the rock phosphate, ore particles of the preferred size range are obtained by grinding larger particles into small sizes. Particles larger than this range can be used, but the rate of solubilization is decreased. Particles smaller than the preferred range can also be used, but the cost of the grinding operation will be increased.

The microorganism, carbon source, and rock phosphate are formulated as granules or pellets to provide a convenient form for delivering the composition to plants. The granules are preferably bounded by a semipermeable membrane to maintain the microorganism, carbon source, and rock phosphate in close physical proximity to one another, although granules lacking a semipermeable membrane are also feasible, such as granules wherein the microorganism, carbon source and rock phosphate ore are held in a porous matrix. The semipermeable membrane or porous matrix provides a physical barrier to prevent the microorganism, carbon source, and rock phosphate ore from readily diffusing or being washed away from the intimate association needed for proper functioning of the composition. The membrane or porous matrix contains pores to permit water to enter the granules and to permit small molecules, such as soluble phosphate and solubilization agents, to diffuse out of the granule and into the surrounding soil. Upon diffusion out of the granules, the soluble phosphate can be taken up by plant roots and provide the phosphorus that is needed for optimum plant growth. The solubilization agent can also diffuse out of the granule into the soil, where it retards fixation of soluble phosphates into insoluble forms. Thus, the diffusion of the solubilization agent improves the efficiency of the composition as a phosphate fertilizer because more of the soluble phosphate remains soluble than with previously known fertilization compositions and methods. Since the composition is a more efficient phosphorus fertilizer, smaller amounts of phosphate need be delivered and crops can be fertilized less frequently, thus providing a saving in both physical and human resources. The size of the granules or pellets is limited only by functionality. The granules should be of a size such that soluble phosphate can easily diffuse out of the granules into the soil environment and so that water can diffuse into the granules. Granules in the range of about 2–5 mm are within this parameter, but other sizes could be used so long as they are functional.

Materials that are suitable for the semipermeable membrane or porous matrix are limited only by functionality. The membrane or matrix should have pores of a size that permit water to diffuse into the granule and allow soluble phosphate and small organic acids to diffuse out of the granules. The membrane or matrix should be nontoxic to the microorganisms and should be resistant to degradation in soil during the course of a growing season, although degradation over a longer period of time would be acceptable or even preferred. Suitable membrane materials include, but are not limited to, polyolefins such as polyethylene, polypropylene, polymethylpentene, and the like; polystyrene or substituted polystyrenes; fluorinated polymers including poly (tetrafluoroethylene), polyvinylidene fluoride, and the like; polysulfones such as polysulfone, polyethersulfone, and the like; polyesters including polyethylene terephthalate, polybutyleneterephthalate, and the like; polyacrylates and polycarbonates; vinyl polymers such as polyvinyl chloride and polyacrylonitriles; and cellulose and modified celluloses such as cellulose esters, cellulose triacetate, and cellulose nitrate. Copolymers can also be used such as copolymers of butadiene and styrene, fluorinated ethylene-propylene copolymer, ethylene-chlorotrifluoroethylene copolymer, and the like. The thickness and pore size of such semipermeable membranes is limited only by functionality. Suitable porous matrix materials include alginate and other polymers that provide sufficient strength for supporting the phosphate solubilizing bacteria and holding the carbon source and insoluble phosphate while exhibiting sufficient porosity to permit flow of water into the granules and flow of soluble phosphate and the solubilization agent out of the granules. The matrix material should also be non-toxic to the bacteria or other microorganisms in the granules. Thus, suitable matrix materials are limited only by functionality.

Granules can be applied by broadcasting, as is done with conventional fertilizer application, followed by tilling to incorporate the granules into the soil. Granules can also be applied by drilling, which results in the granules being applied at a specific depth in a concentrated band. Because granules maintain a constant supply of phosphate available for uptake by plants, application rates of granules are typically lower than for conventional phosphate fertilizers, for example half to one-quarter as much. These rates are dependent on the particular needs of the crop and on soil type.

EXAMPLE 1

A "pseudopellet" system was devised to test the efficacy of compositions according to the present invention in producing a solubilization agent and releasing soluble phosphate into soil. Pseudopellets were prepared as follows.

Cultures of *Acinetobacter calcoaceticus* and *Gluconobacter oxydans* were grown in 50 ml each of Luria broth (LB) overnight. The bacterial cells were then sedimented by centrifugation at 10,000 rpm for 10 min. For each culture, cell paste (0.25 g wet weight) was then mixed with 1 g of a mixture of starch and rock phosphate ore, described in detail below, and used to fill two 8–10 cm tubes of dialysis membrane. Control pseudopellets were prepared that contained the starch/rock phosphate ore mixture but lacked bacterial cells.

The mixture of starch and rock phosphate ore was prepared by mixing 30 parts by weight rock phosphate ore containing 24% $P_2O_5$ in particles that passed through a 200 mesh screen, 50 parts by weight hydrated soluble corn starch, and 20 parts by weight starch hydration medium. The soluble starch was hydrated in an excess of starch hydration medium containing 0.4% (w/v) $(NH_4)_2SO_4$, 0.02% (w/v) $MgSO_4$, 1% glucose, 0.0001% (w/v) $MnCl_2$, 0.00006% (w/v) $FeSO_4$, and 0.00006% (w/v) $NaMoO_4$. Excess medium was then decanted to leave a starch paste. The rock phosphate ore, hydrated starch paste, and starch hydration medium were mixed together and then sterilized by autoclaving. Dialysis tubing, sold under the trademark "SPECTRA/POR," was also sterilized by autoclaving. The dialysis tubing had a molecular weight cut-off of 12,000–14,000, a diameter of 2.5 mm, and a volume/length ratio of 0.05 ml/cm.

Figure 2:
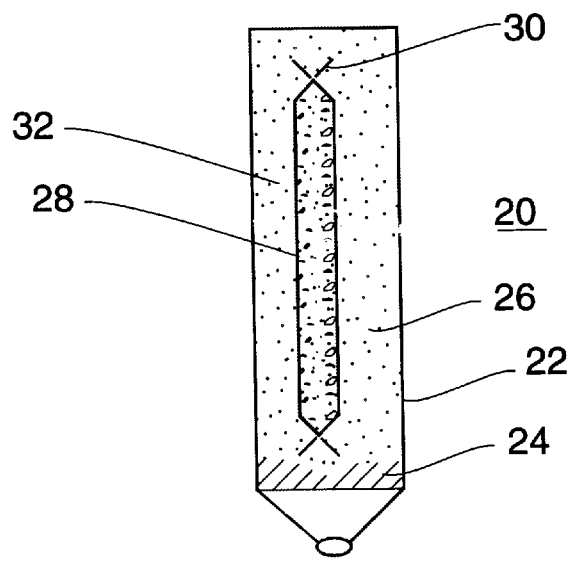
FIG. 2 is a schematic diagram of a soil column and pseudopellet as used in the example.

The filled dialysis membrane tubes were tied securely at both ends, rinsed thoroughly with sterile distilled water, and placed in soil columns. Columns were prepared from 25 ml glass pipettes by cutting off the suction end of the pipettes to leave columns having about 15 ml volumes. The columns were sterilized in an autoclave and the dispensing ends were filled with sterile glass wool. Sterile soil mixture was prepared by mixing 1 part by volume of washed course sand with 3 parts by volume of sandy loam soil screened through a #164 mesh screen and having a bulk density of about 1.26 g/cm$^3$. The mixture was hydrated with distilled water, sterilized by autoclaving for 24 hours, and dried at 80° C. About 1 cm$_3$ of sterile soil mixture was added to each column, then a pseudopellet was suspended vertically in each column and additional sterile soil mixture was placed around the pseudopellets so that the pseudopellets were completely surrounded by soil and did not touch the wall of the column. The columns were filled with additional sterile soil mixture to a depth of about 1 cm above the pseudopellets. A schematic diagram of the soil column design is illustrated in FIG. 2 wherein the soil column 20 comprises a glass column 22 plugged with glass wool 24 to retain the solid contents of the column, but permitting water and soluble materials to pass therethrough. The soil column 20 contains a soil mixture 26 and pseudopellet 32, comprising a mixture 28 of bacteria, starch, rock phosphate ore, glucose, and mineral nutrients contained in dialysis tubing 30.

Two days and 5 days after preparation of the soil columns, about 1 column volume was eluted from each soil column by passing water through the columns. The eluates were collected and analyzed to determine the amounts of phosphate and gluconic acid therein.

Phosphate determinations were made by the stannous chloride-molybdate blue method, Annual Book of ASTM Standards. Part 31: Water (American Society for Testing and Materials, 1977). Sample size was 1 ml. The following table shows that significantly higher amounts of phosphate were eluted from the soil columns containing bacteria than from the control column without bacteria. The nutrient medium used in the pseudopellets was tested under the same conditions and found to have an $OD_{400}$ of 0.0001 or a concentration of 0.0003 mg/100 ml.

TABLE 1

Phosphate Determination in Column Eluates

| | 2 Day | | 5 Day | |
|---|---|---|---|---|
| Sample | $OD_{400}$ | Conc. (mg/100 ml) | $OD_{400}$ | Conc. (mg/100 ml) |
| Control | 0.0017 | 0.0044 | 0.0040 | 0.0103 |
| Ac-1 | 0.0033 | 0.0085 | 0.0282 | 0.0728 |
| Ac-2 | 0.0041 | 0.0106 | 0.0145 | 0.0374 |
| Go-1 | 0.0033 | 0.0085 | 0.0117 | 0.0302 |
| Go-2 | 0.0028 | 0.0072 | 0.0250 | 0.0646 |

Figure 3:
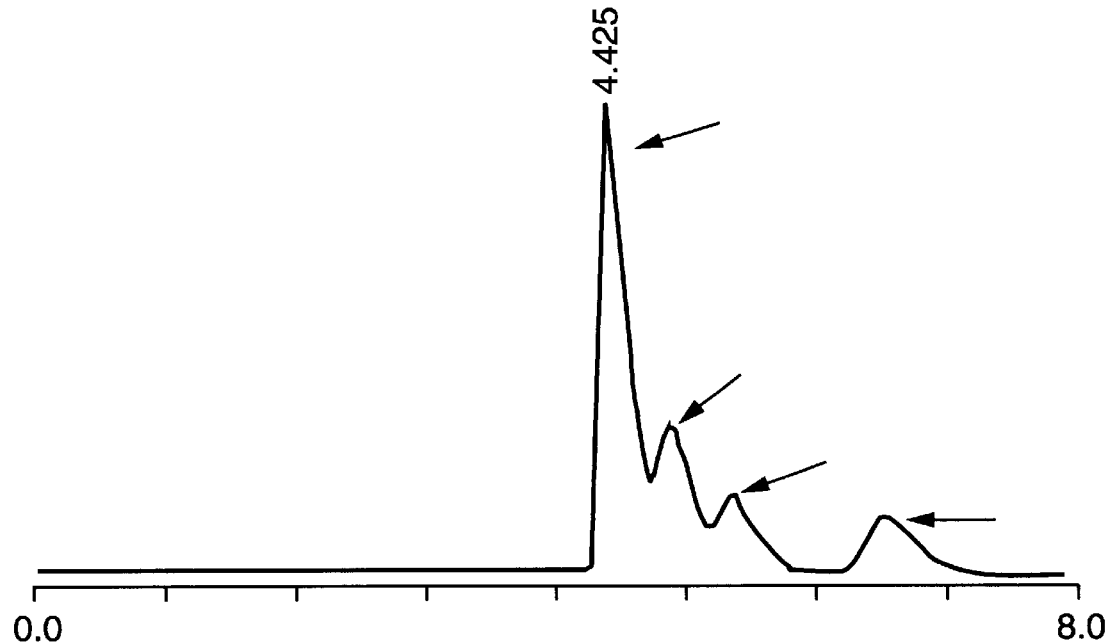
FIG. 3 is an HPLC chromatogram showing separation of gluconic acid, glucose, and gluconolactone.
Figure 4:
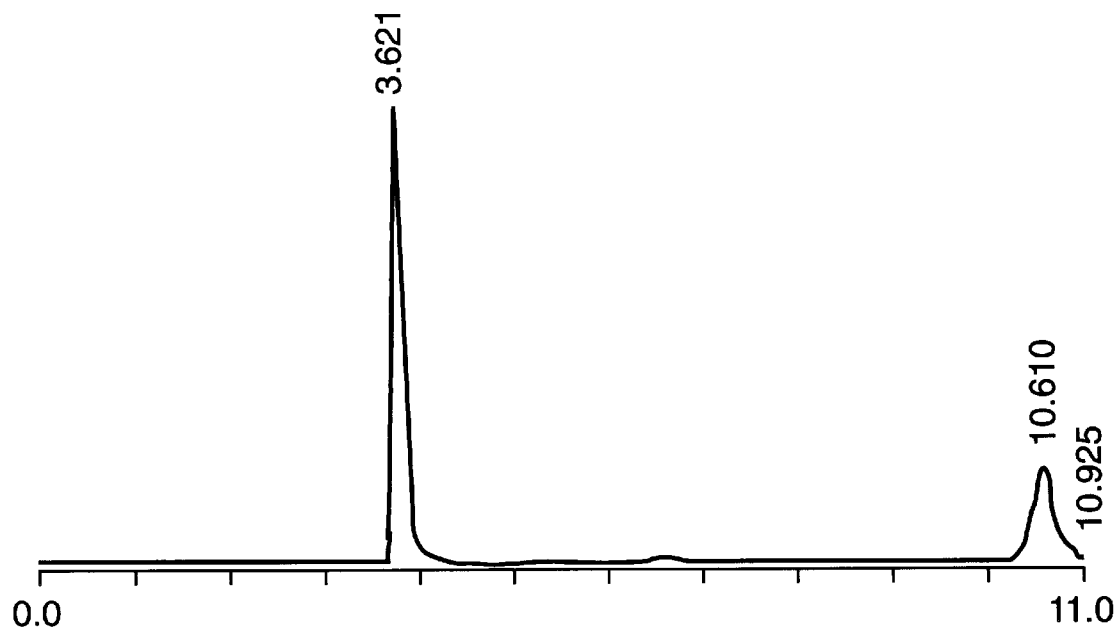
FIG. 4 is an HPLC chromatogram showing resolution of a potassium gluconate peak from a mixture of nutrient medium and potassium gluconate.
Figure 5:
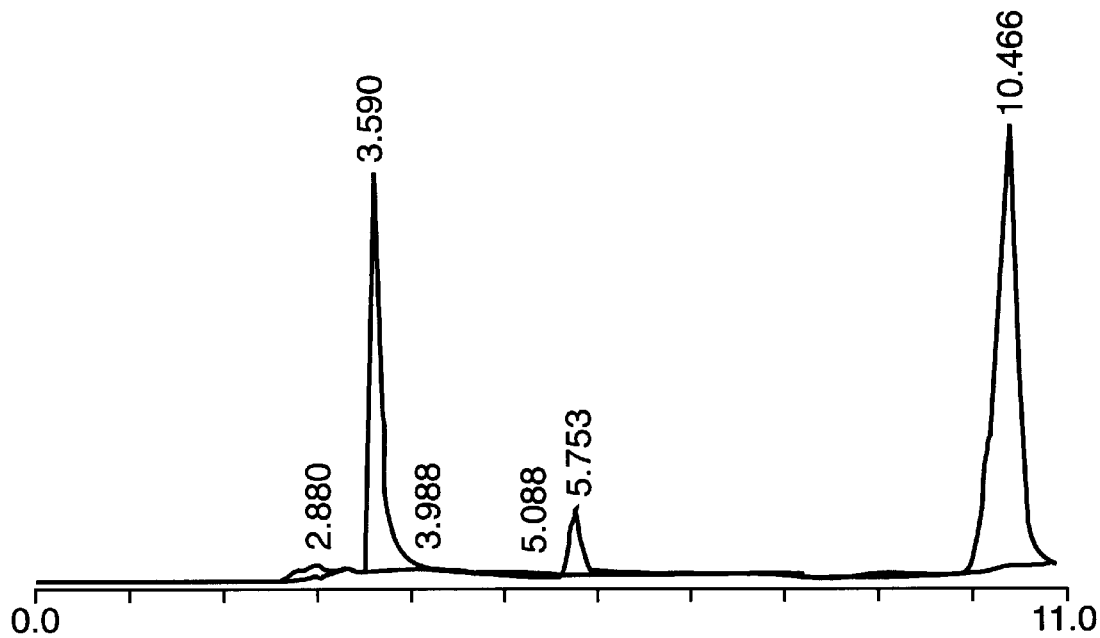
FIG. 5 is an HPLC chromatogram showing resolution of a potassium gluconate peak in an eluate, supplemented with potassium gluconate, from a soil column after 2 days of incubation with an *Acinetobacter calcoaceticus*-containing pseudopellet.
Figure 6:
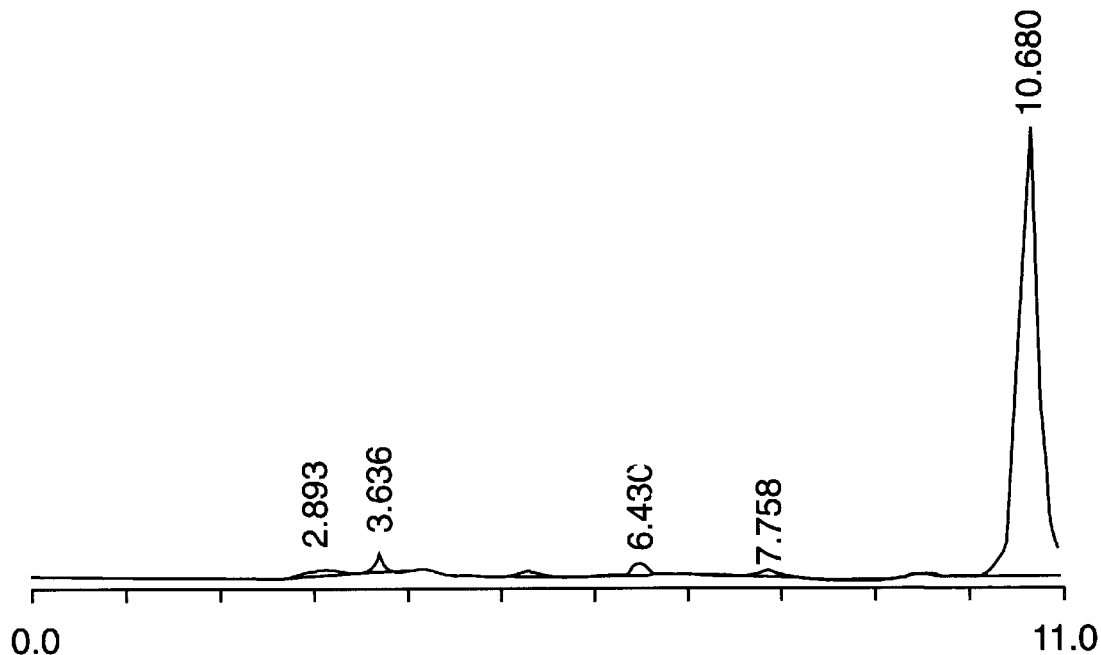
FIG. 6 is an HPLC chromatogram of an eluate from a control soil column after 2 days of incubation with a pseudopellet not containing bacteria.
Figure 7:
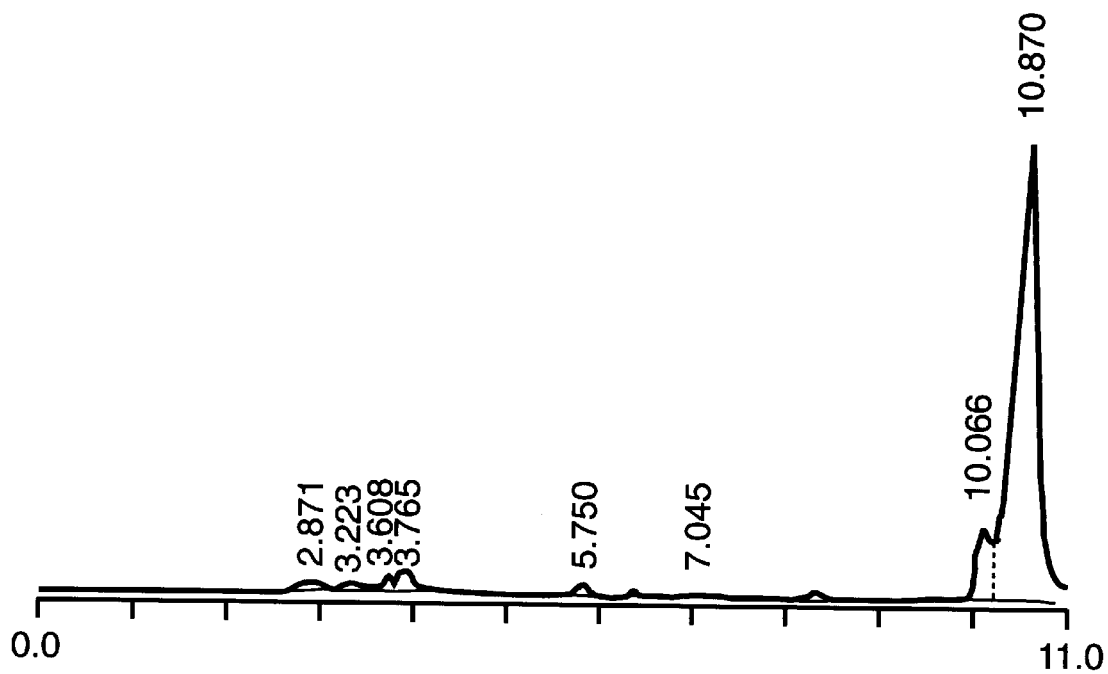
FIG. 7 is an HPLC chromatogram of an eluate from a soil column after 2 days of incubation with a *Gluconobacter oxydans*-containing pseudopellet.

Gluconic acid determinations were made by HPLC. With this procedure, gluconic acid, glucose, and gluconolactone are separable into distinct peaks eluting from the HPLC column, FIG. 3. The elution time of gluconic acid is approximately 3.6 minutes under these conditions, as is shown in FIG. 4 wherein potassium gluconate in nutrient medium is shown eluting at 3.621 minutes. This elution time is somewhat variable, as shown in FIG. 5 where potassium gluconate was added to the 2-day eluate from soil column Ac-1 containing *A. calcoaceticus* and was eluted after 3.590 minutes. FIG. 6 shows an elution profile from the control column, containing a pseudopellet to which no bacteria were added, after 2 days of incubation. Very minor peaks eluted in the first 10 minutes, but a major unidentified peak eluted at 10.680 minutes. Similar peaks eluting at about 10.5 minutes are present in the 2-day eluates from the columns containing bacteria, as shown, for example, in FIG. 7. FIG. 7 also shows typical results obtained from a 2-day eluate from a soil column containing bacteria, in this case *G. oxydans* in soil column Go-2. Several minor peaks elute between about 2 and 8 minutes, including a peak at about 3.6 minutes.

Figure 8:
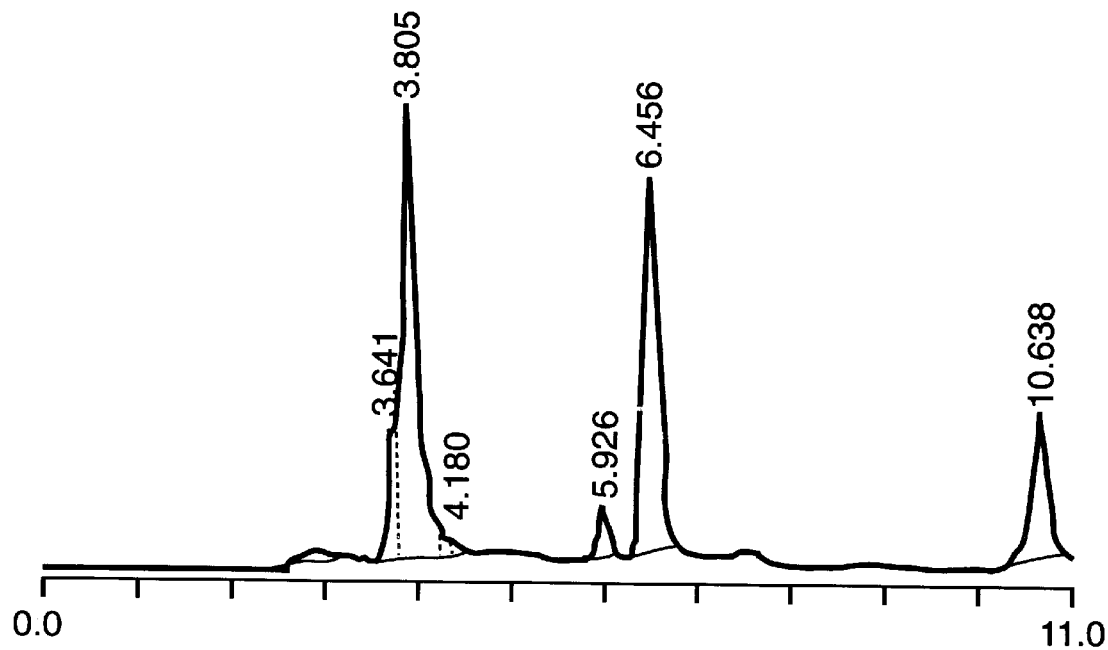
FIG. 8 is an HPLC chromatogram of an eluate from a control soil column after 5 days of incubation with a pseudopellet not containing bacteria.

The control column shows a 5-day elution profile as in FIG. 8. Several prominent peaks are evident, including peaks eluting at 3.641 and 3.805 minutes. Neither of these peaks is thought to be a gluconic acid peak because little or no phosphate eluted from the control column in comparison to the bacteria-containing soil columns, as shown in Table 1. If either of these peaks was gluconic acid, the amount of phosphate eluting from the column would be expected to be larger.

Figure 9:
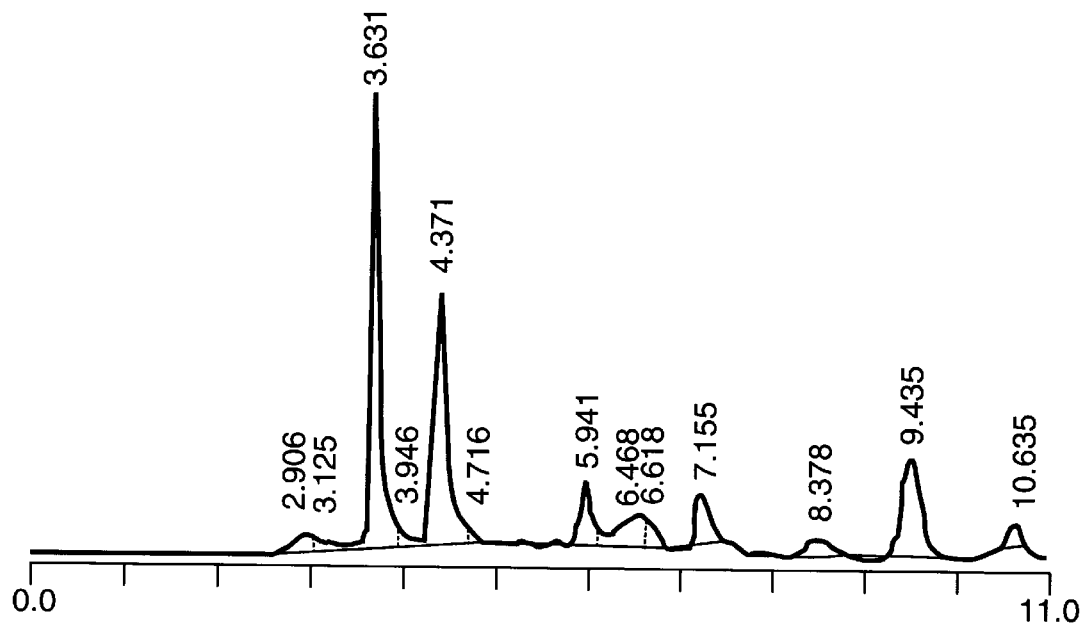
FIGS. 9 and 10 are HPLC chromatograms of eluates from soil columns after 5 days of incubation, respectively, with A. calcoaceticus-containing and G. oxydans-containing pseudopellets.
Figure 10:
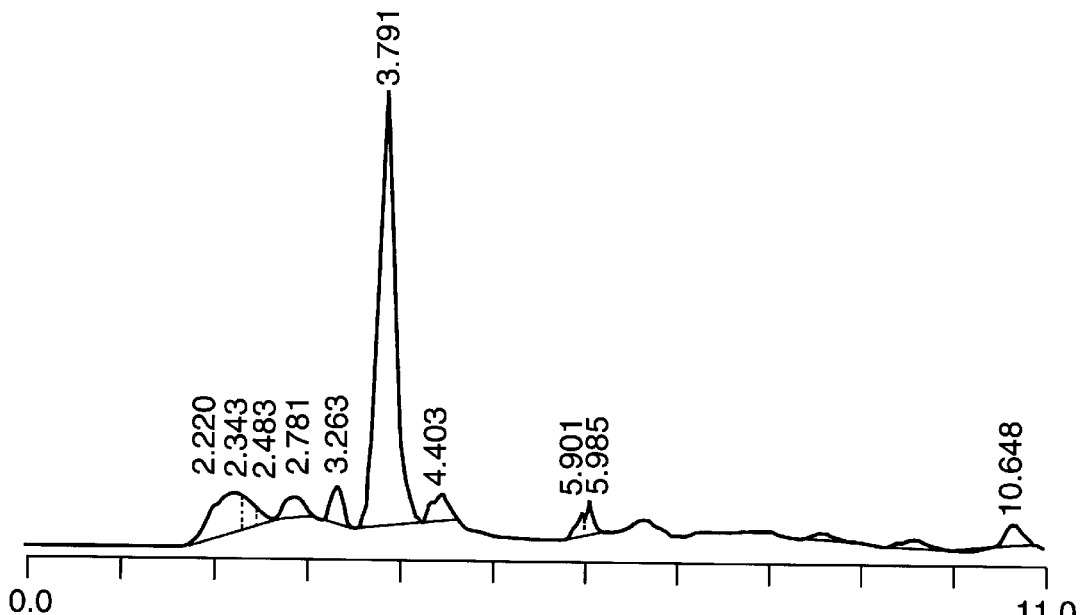

FIGS. 9 and 10 show, respectively, 5-day elution profiles from an *A. calcoaceticus* (sample Ac-2) and a *G. oxydans* (sample Go-1) soil column. Both profiles shown predominant peaks eluting at about 3.6 minutes, which are identified as gluconic acid. In sample Ac-2 the peak eluted at 3.631 minutes, and in sample Go-1 the peak eluted at 3.791 minutes. Minor peaks are also evident in patterns characteristic of the different bacteria used in the experiment. The *A. calcoaceticus*-containing soil columns yielded profiles containing several minor peaks eluting between 4 and 11 minutes, with very little eluting between 0 and 3.3 minutes. The *G. oxydans*-containing soil columns, on the other hand, yielded profiles containing few and relatively indistinct peaks between 4 and 11 minutes, but several distinct peaks between 0 and 3.3 minutes.

TABLE 2

*A. calcoaceticus* - Sample Ac-2

| Peak Elution Time (min.) | Peak Height ($\mu$V) | Peak Area ($\mu$V-sec) | Area % |
|---|---|---|---|
| 2.906 | 3090 | 46,611 | 3.01 |
| 3.125 | 1707 | 25,219 | 1.63 |
| 3.631 | 66,836 | 484,023 | 31.30 |
| 3.946 | 2510 | 16,365 | 1.06 |
| 4.371 | 37,729 | 386,694 | 25.00 |
| 4.716 | 1300 | 16,320 | 1.06 |
| 5.531 | 654 | 3315 | 0.21 |
| 5.941 | 8599 | 72,029 | 4.66 |
| 6.468 | 4513 | 92,042 | 5.95 |
| 6.618 | 3821 | 18,442 | 1.19 |
| 6.773 | 712 | 2648 | 0.17 |
| 7.155 | 7133 | 80,749 | 5.22 |
| 8.378 | 2362 | 30,064 | 1.94 |
| 8.566 | 728 | 5579 | 0.36 |
| 9.435 | 14,793 | 235,676 | 15.24 |
| 9.758 | 444 | 2177 | 0.14 |
| 10.635 | 3132 | 28,492 | 1.84 |
| Total Area | | 1,546,445 | 99.99 |

TABLE 3

| | G. oxydans - Sample Go-1 | | |
|---|---|---|---|
| Peak Elution Time (min.) | Height ($\mu$V) | Area ($\mu$V-sec) | Area % |
| 2.220 | 6839 | 133,680 | 8.75 |
| 2.343 | 4868 | 31,714 | 2.08 |
| 2.483 | 1759 | 10,872 | 0.71 |
| 2.781 | 3268 | 30,318 | 1.98 |
| 3.263 | 6081 | 56,400 | 3.69 |
| 3.791 | 79,266 | 1,041,441 | 68.18 |
| 4.403 | 4902 | 64,788 | 4.24 |
| 4.633 | 208 | 254 | 0.02 |
| 5.421 | 135 | 138 | 0.01 |
| 5.455 | 199 | 33 | >0.01 |
| 5.901 | — | — | — |
| 5.985 | — | — | — |
| 10.648 | — | — | — |
| Total Area | | ND | ND |

ND not determined

EXAMPLE 2

In this example, the results of using smaller volume granules in a porous matrix are given. Such small volume granules are desirable because they provide for more intimate contact between the components of the granule while also reducing the volume of water required. The encapsulation matrix used herein comprises alginate, an inotropic gel that has been commonly used to immobilize microbial cells. Alginate provides sufficient mechanical stability, when mixed with the other ingredients of the granule, to permit production of small stable spheres of a uniform diameter. Cultures of Pseudomonas cepacia E37 were begun in 50 ml of glucose minimal salts medium (GMS) containing 10 g/l glucose, 2 g/l of $(NH_4)_2SO_4$, 0.3 g/l of $MgCl_2 \cdot 6H_2O$, 0.001 g/l of $MnCl_2 \cdot 4H_2O$, 0.0006 g/l of $FeSO_4 \cdot 7H_2O$, 0.0006 g/l of $NaMoO_4$, and 20 $\mu$g/ml amino acids. Alginate beads (2–5 mm diameter) were prepared either with or without rock phosphate ore particles from 3% (w/v) alginate solution made by blending 3 g of alginate powder (Keltone HV) with 97 ml of 0.87% (w/v) NaCl solution. This alginate solution was sterilized by autoclaving for 15 min. at 121° C. Beads containing rock phosphate ore particles also included 4 g of ore particles per 40 ml of alginate solution. Beads containing strain E37 had an initial inoculum concentration of $1.25 \times 10^7$ CFU per ml of sodium alginate. All materials and equipment used in the manufacture of the alginate beads were sterile, and the sterility of alginate beads was determined before use. Approximately 100 beads (1 ml volume) were used in each flask. In treatments in which bacteria were incorporated into the culture medium, the initial inoculum concentration was $1.25 \times 10^7$ CFU per ml of medium. Cultures were incubated at 25° C. on a reciprocating shaker at 80 cycles/min. Triplicate treatments were run for 10 days without a solution change, during which the pH and phosphate concentrations of the solutions were determined.

Figure 11:
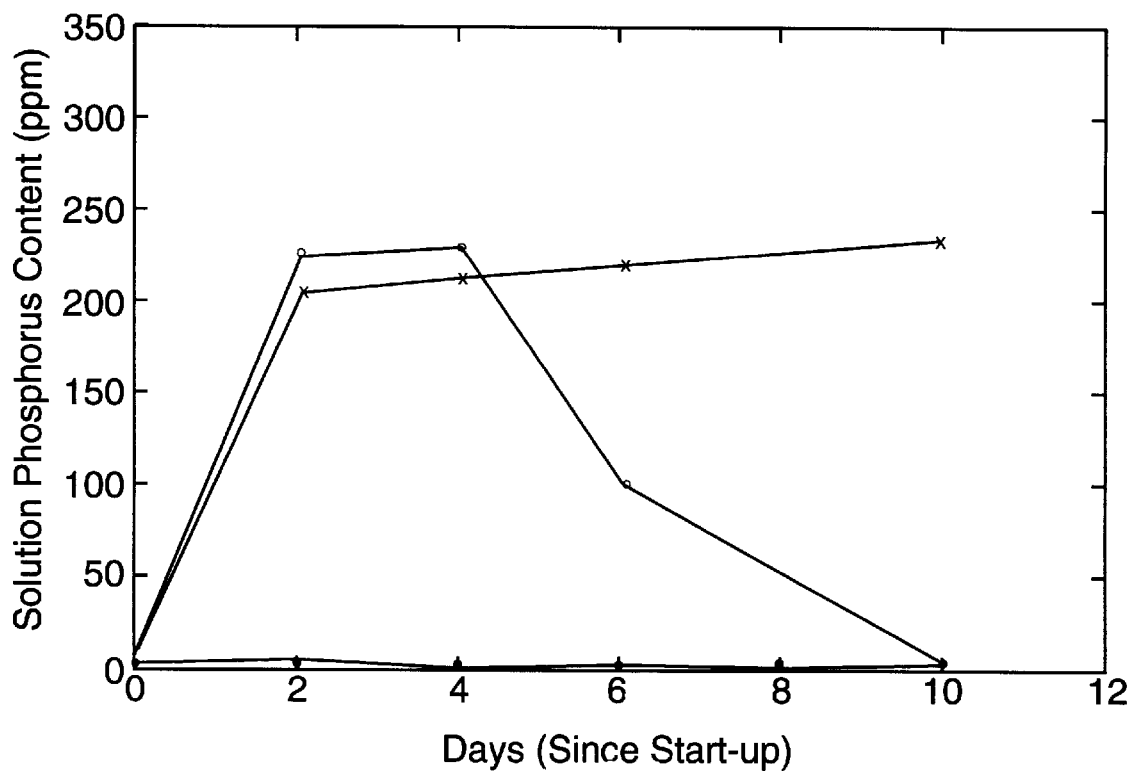
FIG. 11 is a graphic representation of soluble phosphate released by P. cepacia E37 in cultures containing alginate beads: (■) no rock phosphate ore/no bacteria; (+) no rock phosphate ore/bacteria in the medium; (*) rock phosphate ore-containing beads/bacteria in the medium; and (□) rock phosphate ore in medium/bacteria in medium.

FIG. 11 shows the results of this experiment, wherein control cultures lacking rock phosphate ore (+) and lacking both rock phosphate ore and bacterial inoculum (■) failed to release solution phosphate into the medium. Cultures containing free rock phosphate ore in the liquid medium (□) or rock phosphate-containing beads (*) had solution pH's near 3 and greater than 200 ppm solubilized phosphate. Thus, not only did the alginate beads not interfere with growth of the bacteria and solubilization of rock phosphate ore, but the rate of solubilization of the encapsulated rock phosphate ore was comparable to that of the free rock phosphate ore mixed with the inoculum.

EXAMPLE 3

Cultures were prepared as in Example 2, with the exception that one treatment consisted of rock phosphate ore-containing alginate beads to which supplemental calcium (0.8M $CaCl_2$) was added to increase bead strength, and another treatment consisted of rock phosphate-containing alginate beads in which bacteria were incorporated into the beads instead of into the GMS medium. The latter treatment was used to determine if encapsulated bacteria could promote solubilization of encapsulated rock phosphate ore. These beads were prepared similarly to rock phosphate ore-containing beads except that 4 ml of slurried strain E37 cells was added. The slurried E37 cells were prepared by centrifuging 250 ml of a high density culture of E37 cells to form a pellet, and then resuspending the pellet in 10 ml of sterile water. The outside surface of E37-containing beads was sterilized with UV light (30 watt GE G3T8 for 6 hours at a distance of 1.5 m) to inhibit growth of cells in the GMS medium.

Figure 12:
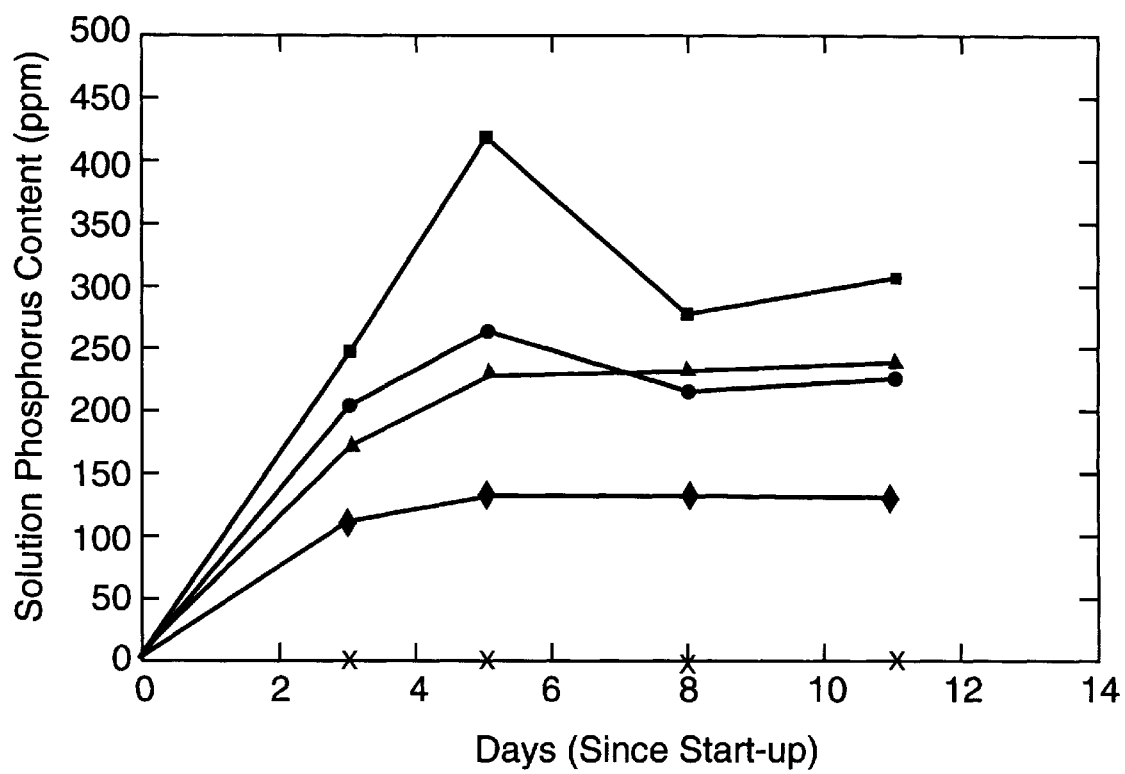
FIG. 12 is a graphic representation of soluble phosphate released by P. cepacia E37 in cultures containing alginate beads: (■) rock phosphate ore in medium/bacteria in the medium; (+) rock phosphate ore-containing beads/bacteria in the medium; (*) rock phosphate ore and Ca-containing beads/bacteria in the medium; (□) beads containing rock phosphate ore, supplemental calcium, and bacteria/no bacteria in the medium; and (X) rock phosphate ore-containing beads/no bacteria.

FIG. 12 show the results of incubating these cultures for 11 days. The results for the control treatments were similar to those shown in FIG. 11. In addition, it was shown that alginate beads containing both rock phosphate ore and phosphate solubilizing bacteria (□) produced soluble phosphate. The concentration of soluble phosphate (about 250 ppm) in this treatment was nearly the same as for rock phosphate-containing beads in inoculated medium (+). To show that solubilization was due to encapsulated bacterial cells and not bacterial cells that escaped the beads and contaminated the medium, the number of viable cells in the medium was monitored. Table 4 shows that contamination of the medium by bacteria from the beads was not detected until Day 5, whereas the solubilization process was well underway by Day 3. Also, there were significantly fewer (about 100-fold) free cells in the cultures with bacteria-containing beads than in the inoculated cultures. This difference in cell numbers supports the conclusion that immobilized E37 cells promoted the solubilization of rock phosphate ore in bacteria and ore-containing alginate beads.

TABLE 4

| | Cells Densities (cells/ml) on Days after Start-Up | | | | |
|---|---|---|---|---|---|
| Beads | 0 | 3 | 5 | 8 | 11 |
| Free ore[a] | $8.5 \times 10^6$ | $13.9 \times 10^6$ | $14.8 \times 10^5$ | $1.7 \times 10^6$ | $1.0 \times 10^6$ |
| Ore[b] | $9.6 \times 10^6$ | $2.9 \times 10^6$ | $0.6 \times 10^5$ | $3.0 \times 10^6$ | $0.2 \times 10^6$ |
| Ore/E37[c] | 0 | 0 | $2.3 \times 10^4$ | $3.5 \times 10^4$ | $6.8 \times 10^4$ |

[a] Ore was added to the medium, but was not contained in the alginate beads.
[b] Ore was contained in the alginate beads.
[c] Ore and bacterial cells were contained in the beads.

EXAMPLE 4

Glass columns similar to those described in Example 1 were autoclaved and then loaded with a slurry containing 25 g of soil mix, 2.5 g of bacteria-containing alginate beads, and 7 ml of a glucose and salts medium. The soil mix contained a 3:1 volume ratio of soil to acid-washed sand prepared as in Example 1. The bacteria-containing beads contained P. cepacia E37 in alginate according to Example 3. The glucose and salts medium contained 1% glucose, 0.1% $MgSO_4$, 0.1% NaCl, and 0.5% $NH_4Cl$, all percentages by weight. The pH was then adjusted to pH 7.2 with 0.1N NaOH. On selected days after preparation of the columns, 2–7 ml of the glucose and salts medium was applied to the tops of the columns and the effluent was collected over the following 24 hour period. The effluents were analyzed for soluble phosphate concentration, gluconic acid concentration, and pH as shown in Table 5.

TABLE 5

| Column no. | Day | Effluent Vol. (ml) | Sol. Phos. (mM) | Gluconic Acid (mM) | pH |
|---|---|---|---|---|---|
| 1 | 3 | 2.8 | 1.7 | <0.5[a] | 6.85 |
| 1 | 7 | 1.3 | 2.8 | 4.4 | 5.21 |
| 3 | 3 | 5.2 | 1.9 | 0.6 | 6.33 |
| 3 | 7 | 2.7 | 2.1 | 3.1 | 5.51 |
| 7 | 2 | 2.65 | 1.4 | 1.7 | 5.90 |
| 7 | 9 | 1.70 | 3.0 | 6.3 | 5.33 |
| 8 | 2 | 2.05 | 1.8 | 0.5 | 6.92 |
| 8 | 9 | 1.50 | 2.8 | 4.5 | 5.37 |
| 9 | 2 | 3.75 | 2.0 | 1.1 | 5.87 |
| 9 | 9 | 2.30 | 2.8 | 6.4 | 5.21 |
| 10 | 2 | 3.00 | 1.6 | 1.6 | 6.17 |
| 10 | 9 | 1.50 | 2.7 | 4.6 | 5.33 |
| 11 | 2 | 3.80 | 1.7 | 1.2 | 6.20 |
| 11 | 9 | 1.70 | 3.0 | 7.7 | 5.21 |
| control | 5 | 15.0 | 0[b] | 0[b] | ND[c] |

[a]The detection limit of the assay is 0.5 mM.
[b]Below the level of detection.
[c]Not done.

Figure 13:
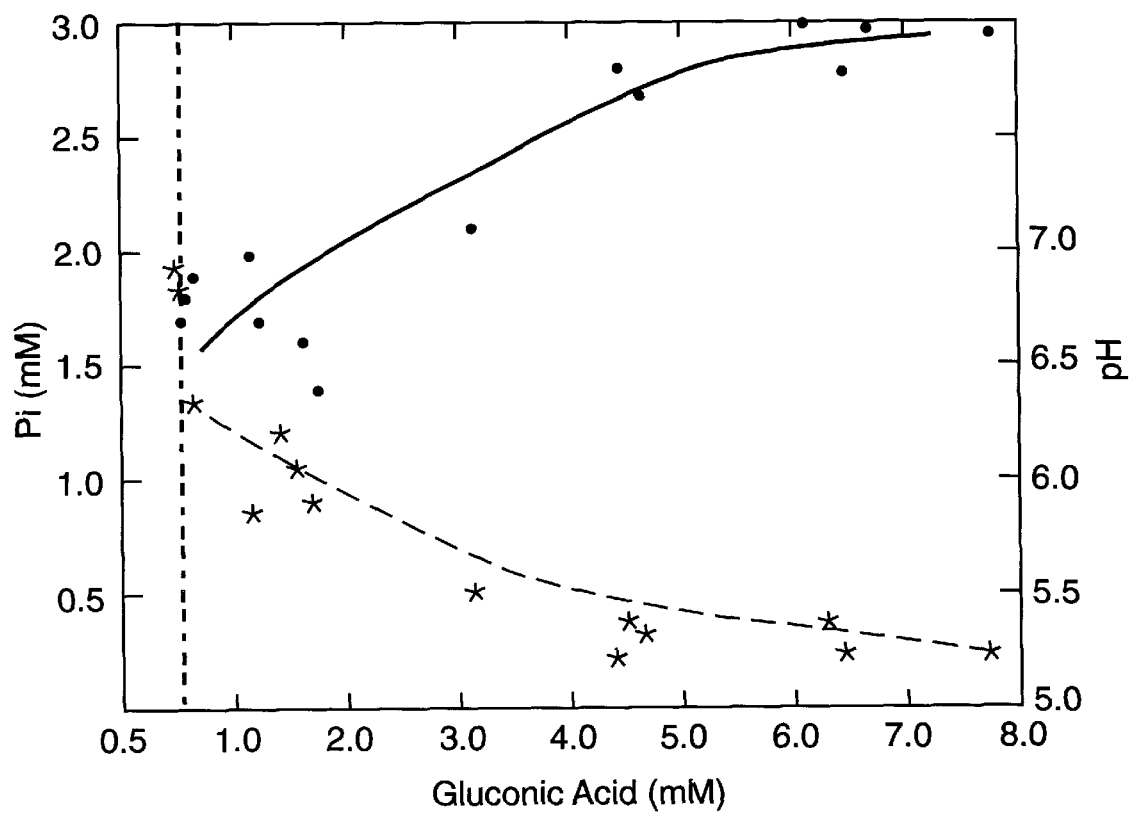
FIG. 13 is a graphic representation of the relationship between gluconic acid concentration (●, solid line), soluble phosphate (Pi) concentration (*, broken line), and pH in effluents from soil columns containing rock phosphate ore and phosphate solubilizing bacteria according to the present invention.

FIG. 13 shows a graph of the approximate relationship between gluconic acid concentration (*, broken line), soluble phosphate (Pi) concentration (●, solid line), and pH of the column effluents. These data show that with glucose as the carbon source, both gluconic acid and soluble phosphate are found in the column effluent. Further, the levels of soluble phosphate in the effluents correlate with the levels of gluconic acid therein. Therefore, this experiment shows that a pelletized or granular formulation of mineral phosphate solubilizing bacteria, a carbon source for being converted metabolically into a solubilizing agent, and a source of insoluble phosphate can convert the carbon source into a solubilization agent which solubilizes the insoluble phosphate and releases it and the solubilization agent into soil.

EXAMPLE 5

A culture of *Pseudomonas pseudomallei* (a species exhibiting both mineral phosphate solubilizing and starch hydrolase activity) is grown to a high density in 250 ml of glucose minimal salts medium (GMS). A slurry of *P. pseudomallei* cells is prepared by centrifuging the 250 ml of high density culture to form a pellet, and then resuspending the pellet in 10 ml of sterile water. Rock phosphate ore particles and hydrated soluble starch are prepared as in Example 1. A 3% (w/v) alginate suspension is made by mixing 3 g of alginate powder (Keltone HV) with 97 ml of 0.87% (w/v) NaCl solution, 0.1M $CaCl_2$ and autoclaving for 15 min. at 121° C. Alginate beads (2–5 mm diameter) are prepared by extruding 100 ml of the alginate solution with 10 g of rock phosphate ore particles and 10 ml of bacterial slurry. All materials and equipment used in the manufacture of the alginate beads are sterile.

EXAMPLE 6

The procedure of Example 5 is followed with the exception that the 3% alginate suspension is replaced by 1% starch.

I claim:

1. A composition for providing continuous release of soluble phosphate to soil for uptake by plants comprising:

(a) a microorganism capable of producing and releasing a solubilization agent for solubilizing insoluble phosphate;

(b) a carbon source for providing raw material to the microorganism for conversion into the solubilization agent; and (c) a source of insoluble phosphate for being solubilized by the solubilization agent, thereby releasing soluble phosphate;

wherein the composition is formulated in a physical form having an exterior semipermeable membrane such that the microorganism, carbon source, and source of insoluble phosphate are retained adjacent to each other within the semipermeable membrane and the soluble phosphate is diffusible out of the semipermeable membrane into the soil.

2. The composition of claim 1 wherein the source of insoluble phosphate comprises rock phosphate ore.

3. The composition of claim 2 wherein the microorganism is selected from the group consisting of the genera Erwinia, Pseudomonas, Gluconobacter, Klebsiella, Acinetobacter, Aspergillus, Penicillium, Paecilomyces, Acremonium, Verticillium, Geomyces, Chrysosporium, and mixed cultures thereof.

4. The composition of claim 3 wherein the organism is selected from the group consisting of *Erwinia herbicola, Pseudomonas cepacia, Gluconobacter oxydans, Acinetobacter calcoaceticus, Aspergillus niger, Aspergillus phenicis, Penicillium herquei, Penicillium funiculosum, Penicillium lanoso-coerulum, Penicillium simlicissum, Penicillium atramentosum, Penicillium roquefortii*, Paecilomyces sp., Acremonium sp., Verticillium sp., Geomyces sp., Chrysosporium sp., and mixed cultures thereof.

5. The composition of claim 2 wherein the solubilization agent is selected from the group consisting of gluconic acid, 2-ketogluconic acid, lactic acid, glycolic acid, fumaric acid, and succinic acid and mixtures thereof.

6. The composition of claim 5 wherein the solubilization agent is a member selected from the group consisting of gluconic acid, 2-ketogluconic acid, and mixtures thereof.

7. The composition of claim 2 wherein the carbon source is selected from the group consisting of glucose and polymers and copolymers thereof.

8. The composition of claim 7 wherein the carbon source is starch.

9. The composition of claim 2 wherein the rock phosphate ore comprises particles in the size range of about 0.0025 to 0.05 inch in diameter.

10. The composition of claim 1 wherein the semipermeable membrane comprises a polymeric membrane.

11. The composition of claim 10 wherein the polymeric membrane is selected from the group consisting of polyolefins; polystyrenes; substituted polystyrenes; fluorinated polymers; polysulfones; polyesters; polyacrylates; polycarbonates; vinyl polymers; cellulose; modified celluloses; copolymers of butadiene and styrene; fluorinated ethylene-propylene copolymer; ethylene-chlorotrifluoroethylene copolymer; and mixtures thereof and the like.

12. The composition of claim 2 wherein the physical form comprises a porous matrix composed of a non-toxic material of sufficient strength to support the microorganism and sufficient porosity to permit flow of water into the granule and flow of soluble phosphate out of the granule.

13. The composition of claim 12 wherein the porous matrix is composed of alginate.

14. A method for delivering soluble phosphate to soil for uptake by plants, comprising the steps of:

(a) providing a composition for furnishing continuous release of soluble phosphate into soil for uptake by plants comprising:

(i) a microorganism capable of producing and releasing a solubilization agent for solubilizing insoluble phosphate;

(ii) a carbon source for providing raw material to the microorganism for conversion into the solubilization agent; and (iii) a source of insoluble phosphate for being solubilized by the solubilization agent, thereby releasing soluble phosphate;

wherein the composition is formulated in a physical form having an exterior semipermeable membrane such that the microorganism, carbon source, and source of insoluble phosphate are retained adjacent to each other within the semipermeable membrane and the soluble phosphate is diffusible out of the semipermeable membrane into the root zone of plants; and (b) placing the composition of step (a) in the soil.

15. The method of claim 14 wherein the source of insoluble phosphate comprises rock phosphate ore.

16. The method of claim 15 wherein the microorganism is selected from the group consisting of the genera Erwinia, Pseudomonas, Gluconobacter, Klebsiella, Acinetobacter, Aspergillus, Penicillium, Paecilomyces, Acremonium, Verticillium, Geomyces, Chrysosporium, and mixed cultures thereof.

17. The method of claim 16 wherein the microorganism is selected from the group consisting of *Erwinia herbicola, Pseudomonas cepacia, Gluconobacter oxydans, Acinetobacter calcoaceticus, Aspergillus niger, Aspergillus phenicis, Penicillium herquei, Penicillium funiculosum, Penicillium lanoso-coerulum, Penicillium simlicissum, Penicillium atramentosum, Penicillium roquefortii*, Paecilomyces sp., Acremonium sp., Verticillium sp., Geomyces sp., Chrysosporium sp., and mixed cultures thereof.

18. The method of claim 15 wherein the solubilization agent is selected from the group consisting of gluconic acid, 2-ketogluconic acid, lactic acid, glycolic acid, fumaric acid, and succinic acid and mixtures thereof.

19. The method of claim 18 wherein the solubilization agent is a member selected from the group consisting of gluconic acid 2-ketogluconic acid, and mixtures thereof.

20. The method of claim 15 wherein the carbon source is selected from the group consisting of glucose and polymers and copolymers thereof.

21. The method of claim 20 wherein the carbon source is starch.

22. The method of claim 15 wherein the rock phosphate ore comprises particles in the size range of about 0.0025 to 0.05 inch in diameter.

23. The method of claim 15 wherein the physical form comprises a porous matrix composed of a non-toxic material of sufficient strength to support the microorganism and sufficient porosity to permit flow of water into the granule and flow of soluble phosphate out of the granule.

24. The composition of claim 23 wherein the porous matrix is composed of alginate.

25. The method of claim 14 wherein the semipermeable membrane comprises a polymeric membrane.

26. The method of claim 25 wherein the polymeric membrane is selected from the group consisting of polyolefins; polystyrenes; substituted polystyrenes; fluorinated polymers; polysulfones; polyesters; polyacrylates; polycarbonates; vinyl polymers; cellulose; modified celluloses; copolymers of butadiene and styrene; fluorinated ethylene-propylene copolymer; ethylene-chlorotrifluoroethylene copolymer; and mixtures thereof.

27. The method of claim 14, wherein said soil comprises a root zone containing roots of said plants, further comprising placing the composition of step (a) adjacent to said root zone.

* * * * *